United States Patent [19]
Olivier

[11] Patent Number: 4,594,386
[45] Date of Patent: Jun. 10, 1986

[54] POLYAMIDE GRAFTED EPM BLEND
[75] Inventor: Errol J. Olivier, Baton Rouge, La.
[73] Assignee: Copolymer Rubber & Chemical Corporation, Baton Rouge, La.
[21] Appl. No.: 537,789
[22] Filed: Sep. 30, 1983

Related U.S. Application Data

[63] Continuation-in-part of Ser. No. 522,987, Aug. 15, 1983, abandoned.
[51] Int. Cl.$^4$ .................. C08L 51/00; C08L 77/00; C08F 283/04
[52] U.S. Cl. ..................... 525/66; 525/183; 525/426
[58] Field of Search ................ 525/66, 426, 183

[56] References Cited

U.S. PATENT DOCUMENTS

| | | | |
|---|---|---|---|
| 3,274,289 | 9/1966 | Murdock et al. | 525/167 |
| 3,484,403 | 12/1969 | Brunson et al. | 525/184 |
| 3,676,400 | 7/1972 | Kohan et al. | 524/343 |
| 3,862,265 | 1/1975 | Steinkamp | 525/285 |
| 4,017,557 | 4/1977 | Hammer et al. | 525/66 |
| 4,026,967 | 5/1977 | Flexman et al. | |
| 4,031,062 | 6/1977 | Shirayama et al. | |
| 4,161,452 | 7/1979 | Stambaugh et al. | |
| 4,174,358 | 11/1979 | Epstein | 525/183 |
| 4,251,644 | 2/1981 | Joffrion | 525/66 |

FOREIGN PATENT DOCUMENTS

| | | | |
|---|---|---|---|
| 0029566 | 6/1981 | European Pat. Off. | 525/66 |
| 2420942 | 4/1974 | Fed. Rep. of Germany | 525/66 |
| 55-9661 | 1/1980 | Japan | 525/66 |
| 1403797 | 8/1975 | United Kingdom | 525/66 |

Primary Examiner—John C. Bleutge
Assistant Examiner—A. L. Carrillo
Attorney, Agent, or Firm—McDougall, Hersh & Scott

[57] ABSTRACT

Impact strength and toughness of polyamide resins are improved by blending resin with up to 50 percent by weight maleic anhydride grafted EPM rubber of low molecular weight and exposing the mixture to elevated temperature during blending.

15 Claims, No Drawings

POLYAMIDE GRAFTED EPM BLEND

This is a continuation-in-part of my co-pending application Ser. No. 522,987, filed Aug. 15, 1983, now abandoned, and entitled Grafted and Crosslinked EPM.

FIELD OF THE INVENTION

This invention relates to the improvement in impact strength and toughness of caprolactams and other polyamide (nylon) resins.

BACKGROUND OF THE INVENTION

Improvement of impact strength and toughness of polyamide resins has been made the subject matter of research and development over a considerable period of time. The tendency of articles molded of polyamide resins to crack or break upon impact, in a brittle fashion, imposes a serious limitation on the ability to make use of such molded articles, especially at low temperatures.

The endeavors to improve impact strength and toughness has led to the blending of the polyamides, with a variety of additives including rubbers and other modified and unmodified resins with various degrees of success. One such recent endeavor is described in the Epstein U.S. Pat. No. 4,174,358, issued Nov. 13, 1979, wherein polyamide resins are blended with random copolymers selected to adhere to the polyamide resin. The Epstein patent does not address the issue of impact strength at low temperatures, and it does not recognize the advantages derived from the use of low molecular weights for blending with the polyamide resins.

SUMMARY OF THE INVENTION

It has been found, in accordance with the practice of this invention, that marked improvement in impact strength and toughness of polyamide resins can be achieved by blending the polyamide resin with an ethylene-$C_3$-$C_{12}$ mono-olefin copolymer which has been grafted with a dicarboxylic acid anhydride or corresponding mono or diacid. There are a number of criteria which should be followed in order to achieve the desired results sought to be obtained by the practice of this invention. Prior to grafting, the rubbery backbone EPM polymer should be a saturated EPM polymer, otherwise permanent crosslinks are formed upon grafting with the dicarboxyl acid or anhydride, and such permanent crosslinking has been found to interfere with the dispersion of the grafted copolymer with the matrix polyamide resin, with the result that optimum benefits are not derived from the blends. The rubbery backbone EPM should be of a low molecular weight in order to achieve a better blend of the grafted EPM rubbery polymer with the polyamide and in order to obtain improved dispersion of the grafted EPM rubber as fine particles.

For a detailed description of a grafted EPM rubbery polymer, suitable for use in the practice of this invention, reference is made to my aforementioned application Ser. No. 522,987. Briefly described, a low molecular weight EPM copolymer rubber is formed by copolymerization in solvent solution, in the presence of a Ziegler-type catalyst, of ethylene and one or more mono-olefins, preferably propylene, but which may include 1-butene, 1-pentene, or other mono-olefins having from 3-12 carbon atoms. The ratio of ethylene to propylene or $C_3$-$C_{12}$ mono-olefin may range from 10-95 moles of ethylene to 5-90 moles of propylene or other mono-olefins, but the unique properties of the invention are best developed with the use of a low molecular weight EPM backbone polymer in which the ratio of ethylene to propylene is in the higher range of 55-88 moles ethylene to 45-12 moles propylene or other mono-olefin.

The solvent medium in which the copolymerization reaction is carried out may be any suitable inert organic solvent that is liquid under reaction conditions and it may be a prior art solvent for solution polymerization of mono-olefin in the presence of a Ziegler type catalyst. Examples of satisfactory hydrocarbon solvents include straight chain paraffins having from 5-8 carbon atoms, with best results often being secured by the use of hexane; aromatic hydrocarbons and preferably an aromatic hydrocarbon having a single benzene nucleus, such as benzene, toluene and the like; and saturated cyclic hydrocarbons having boiling point ranges approximating those of the straight chain paraffin hydrocarbons and aromatic hydrocarbons described above, and preferably saturated cyclic hydrocarbons having 5-6 carbon atoms in the ring nucleus. The solvent selected may be a mixture of one or more of the foregoing hydrocarbons and preferably a mixture of aliphatic and napthenic hydrocarbons having approximately the same boiling range as normal hexane. It is desirable that the solvent be dry and free of substances that will interfere with the Ziegler type catalyst used in the polymerization reaction.

Ziegler catalysts of the type well known to the prior art may be used. Such Ziegler type catalysts are disclosed in a large number of patents, such as U.S. Pat. Nos. 2,933,480, 3,093,620, 3,093,621, 3,211,709 and 3,113,115. Examples of Ziegler catalysts include metal organic coordination catalysts prepared by contacting a compound of a heavy metal of the group IV-a, V-a, VI-a and VII-a of the Mendeleeff periodic system of elements, such as titanium, vanadium and chromium halides with an organo-metallic compound of a metal of groups I, II or III of the Mendeleeff periodic system which contains at least one carbon-metal bond, such as trialkyl aluminum, and allyl aluminum halides in which the alkyl groups contain from 1-20 and preferably 1-4 carbon atoms.

The preferred Ziegler catalyst for interpolymerization to produce EPM polymers is prepared from a vanadium compound and an alkyl aluminum halide. Examples of suitable vanadium compounds include vanadium trichloride, vanadium tetrachloride, vanadium oxychloride, vanadium acetyl acetonate, etc. Activators which are especially preferred include alkyl aluminum chlorides of U.S. Pat. No. 3,113,115, general formula $R_1AlCl_2$ and $R_2AlCl$ and the corresponding sesquichlorides of the general formula $R_3Al_2Cl_3$ in which R is methyl, ethyl, propyl, butyl or isobutyl. In the catalyst system, the aluminum to vanadium mole ratio of the aluminum and vanadium compounds may be within the range of 5/1 to 200/1 and preferably within the range of 15/1 to 60/1, with best results being secured in the ratio of 40 aluminum to 1 vanadium. These same ratios apply with respect to corresponding compounds of others of the heavy metals substituted for the vanadium compound and the organo-metallic compounds of groups I, II or III for the aluminum compounds. A catalyst prepared from alkyl aluminum sesquichloride, such as the methyl or ethyl aluminum sesquichloride and vanadium oxychloride is preferred in the ratio of 1 mole vanadium oxychloride per 5-300 moles of aluminum and more preferably 15-60 moles of aluminum, with 40 moles of aluminum per mole of vanadium yielding the best results.

The polymerization is preferably carried out on a continuous basis in a reaction vessel closed to the outside atmosphere, which is provided with an agitator, cooling means and conduit means for continuously supplying the ingredients of the reaction including monomer, catalyst and accelerators and conduit means for continuously withdrawing solution containing elastomer. The polymerization is carried out in a liquid phase in the organic solvent in the presence of a Ziegler catalyst. The solution of elastomer in the polymerization solvent is withdrawn continuously from the reaction vessel, the catalyst is killed by the addition of a catalyst deactivator. When expressed on the basis of RSV, withdrawal is carried out to provide a low molecular weight polymer having an RSV within the range of 0.4–3.0 and preferably 0.7–2.5 measured as a 0.1 percent solution in decalin at 135° C.

As the component grafted onto the EPM rubbery copolymer, it is preferred to make use of maleic anhydride but other unsaturated dicarboxylic acid anhydrides or acids may be used having the general formula

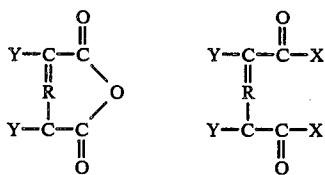

in which R is an alkyl group having from 0–4 carbon atoms and Y is preferably hydrogen but may be an organic group such as a branched or straight chain alkyl group, an anhydride, ketone, heterocyclic or other organic group of 1–12 carbon atoms, a halogen group such as chlorine, bromine, or iodine and in which at least one, and preferably both of the X groups are hydroxyl but in which one of the X groups may be an ester forming group such as an alkoxy or aryloxy group having from 1–8 carbon atoms. It is preferred to make use of an anhydride as the component grafted onto the EPM polymer since the diacid does not rely on hydrolysis for hydrogen bonding and thus crosslinking proceeds at an excessive rate which results in a higher viscosity by comparison with grafting with the corresponding anhydride.

For example, the maleic anhydride in the following examples may be substituted in whole or in part with equal molecular equivalents of other unsaturated dicarboxylic acids or anhydrides, such as itaconic acid or anhydride, fumaric acid or anhydrides, maleic acid and the like.

The grafting reaction is carried out in the presence of a peroxide catalyst such as dicumyl peroxide, t-butyl hydroperoxide, benzoyl peroxide, t-butylperoctanoate, di-t-butylperoxide, t-butylhydroperoxide, cumen hydroperoxide, t-butylperbenzoate or other free radical source capable of hydrogen abstraction, as represented by alkyl peroxy esters, alkyl peroxides, alkyl hydroperoxides, diacylperoxides and the like.

The desired results are achieved when the amount of anhydride or diacid grafted onto the EPM polymer is within the range of 0.2–5 percent by weight of the base polymer and preferably in an amount within the range of 0.5–4 percent graft. In general, the amount grafted onto the polymer will represent only 30–50 percent of the graft material reacted with the polymer. For example, to achieve a graft of 4 percent maleic anhydride onto a preformed EPM polymer, a charge of about 10 percent maleic anhydride will be required.

The EPM backbone polymers grafted with maleic anhydride or other unsaturated dicarboxylic acid or anhydrides exhibit increased Mooney viscosity (a measure of molecular weight) and melt strength without appreciable change in actual molecular weight as measured by RSV. This is an important benefit in that at low molecular weight, liquid polymers are converted to solid grafted polymers without permanent change in molecular weight. This is believed to result from a reversible crosslinking reaction that results from hydrogen bonding or polar interactions between the grafted carboxylic groups grafted unto the EPM polymer. The reversible crosslinking is believed to provide the benefit of the enhanced Mooney viscosity and melt strength while the reversible crosslinks are capable of being disrupted upon exposure to the elevated temperatures used for blending the grafted EPM rubbery polymer with the polyamide resin with the result that the crosslinked EPM rubber reverts to almost the original low molecular weight liquid in the polymer blend. This results in easier and better dispersion of the EPM polymer in the polyamide resin, with a corresponding increase in impact strength and toughness of the resulting blend.

In general, the water that is made available in the system is sufficient to provide for the progressive hydrolysis of the grafted EPM polymer whereby hydrogen bonding can take place to produce the desired adduct as a product. However, the reversible crosslinking reaction of the grafted polymer can be accelerated and more easily controlled to achieve desired levels of molecular weight increase by the addition of water to the grafted copolymer.

It is widely known that unmodified EPM rubbers produce non-homogenous blends having no property enhancements when admixed with polyamide resins. This is possibly because of incompatibility of the EPM rubber due to its inherent non-polar nature. On the other hand, the maleic anhydride grafted EPM described herein provides homogenous blends with polyamide resins to yield a product with significant improvement in impact strength and toughness. Further effect of compatibility is illustrated by the excellent knitline strength of the grafted EPM rubber-polyamide resin blends. Further, the greater compatibility between the maleic anhydride grafted EPM rubbers with the polyamide resins, in accordance with the practice of this invention, enables full advantage to be taken of the superior weather resistant properties of the EPM rubber component.

Improvement in impact strength is obtained with a blend in which the grafted EPM rubber is present in an amount as little as 1% by weight and as much as 50% by weight, but it is preferred to make use of the EPM rubbers of this invention in the amount within the range of 5–25%, by weight of the blended product.

Such blends can be produced in various ways which involve mixing of the grafted EPM rubber with the polyamide resin at elevated temperatures whereby the crosslinkages of the grafted EPM rubber are disrupted for recapture of the lower molecular weight properties of the original backbone rubber while still retaining the grafted component further to enhance compatibility between the EPM rubber and the polyamide resinous components.

As used herein, the term "Polyamide resin" includes all polymers having recurring carbonamide groups in the main chain, and having molecular weights greater than 2000. "Molecular weight", as used herein, refers to number average molecular weight for polyamides (see Flory "Principals of Polymer Chemistry", page 273, published 1953 by Cornell University Press).

The polyamide resin is ordinarily produced by condensation of equimolar amounts of dicarboxylic acid or acid derivative containing from two to twenty carbon atoms with a diamine, containing from two to fifteen carbon atoms, or by lactam polymerization according to well known techniques. Preferred polyamides are those based on lactams and those based on aliphatic diamines condensed with aliphatic or aromatic diacids. Included in this group are polyhexamethylene adipamide (nylon, 6.6), polycaprolactam (nylon 6), poly(undecaneamide) (nylon 11), polyhexamethylene sebacamide (nylon 6.10), polyhexamethylene isophthalamide, polyhexamethylene tereco-isophthalamide, and mixtures or copolymers thereof.

Similar polyamides have been marketed by Allied Corporation under the trade name Capron 8202C and by Firestone Rubber Company under the trade name 228-001 (low viscosity) and with the suffix HS which means heat stabilized.

Having described the basic concepts of this invention, illustration will now be made by way of the following examples.

EXAMPLE 1

Preparation of a 1.18 RSV, 55 mole percent ethylene-45 mole percent propylene EPM (base rubber)

Into a one gallon continuous stirred tank reactor operating at a temperature of 35° C. and a pressure of approximately 45 psia are fed hexane, ethylene, and propylene at rates of 59 cc/min., 1285 cc/min., and 3283 cc/min., respectively. Simultaneously there are fed an ethylaluminum sesquichloride and vanadium oxytrichloride catalyst mixture having an Al/V molar ratio of 20/1, ethyl perchlorocrotonate promoter, and a Lewis base.

The catalyst mixture is added on demand to maintain the operating pressure. The molar ratio of promoter to vanadium is one. The concentration of the Lewis base is one millimole/l. Under these conditions, a 1.18 RSV (as measured on a 0.1% solution in decalin at 135° C.), 55 mole percent ethylene EPM rubber is produced at a rate of 169 g/hr. The polymerization mixture is allowed to overflow into a water washpot where the catalyst is deactivated and largely removed from the cement. The cement and water are separated in a decanting operation. The polymer may be recovered by precipitation using a non-solvent, steam coagulation, or evaporation of the hexane. Alternatively, the polymer may be retained in solution for further use, such as solution grafting in accordance with the preferred practice of this invention.

EXAMPLE 2

Preparation of a 1.92 RSV, 55 mole percent ethylene-45 mole percent propylene EPM (base rubber)

Into a one gallon continuous stirred tank reactor operating at a temperature of 45° C. and a pressure of approximately 45 psia are fed hexane, ethylene, and propylene at rates of 60 cc/min., 1260 cc/min., and 2909 cc/min., respectively. Simultaneously are fed an ethylaluminum sesquichloride and vanadium oxytrichloride catalyst mixture having an Al/V molar ratio of 20/1, ethyl perchlorocrotonate promoter, and a Lewis base.

The catalyst mixture is added on demand to maintain the operating pressure. The molar ratio of promoter to vanadium is one. The concentration of the Lewis base is one millimole/l. Under these conditions a 1.92 RSV, 55 mole percent ethylene EPM rubber is produced at a rate of 169 g/hr. The polymerzation mixture is allowed to overflow into a water washpot where the catalyst is deactivated and largely removed from the cement. The mixture is then led to a decanter where the water phase is separated from the solvent phase containing about 5% by weight of polymer in hexane.

In accordance with the practice of this invention, the manufacture of EPM preferred polymers is interrupted at the cement stage and the grafting reactions are carried out on the polymer while in solution in the solvent in which the monomers are polymerized. This enables the grafting reaction to be performed on polymers having a molecular weight measuring as low as 0.4 RSV without the need to subject a preformed polymer to degradation for reduction of molecular weight for subsequent use. This enables operation of a continuous process wherein the polymer solution can enter into the grafting vessel without the need for recovery of the polymer prior to grafting reaction.

While it is preferred to carry out the grafting reaction while the polymer is in the cement stage during manufacture of the polymer, as described in the Joffrion U.S. Pat. No. 4,340,689, thereby to avoid the need to continue the reaction to a solid rubber for separation and subsequent breakdown to a low molecular weight polymer for reaction, as described in the aforementioned U.S. Pat. No. 4,146,489, it will be understood that the concepts of this invention can be practiced on the low molecular weight EPM which has been reduced from a solid state by thermal or mechanical degradation.

The following examples illustrate peroxide induced solution grafting of maleic anhydride onto an EPM backbone copolymer in accordance with the practice of this invention.

EXAMPLE 3

The starting polymer is an amorphous ethylene/propylene rubber of Example 1 having about 55 mole percent ethylene, 1.18 RSV as measured on a 0.1% solution in decalin at 135° C., and a Mooney viscosity of ML (1+4) 3 at 257° F. The melt flow index of the starting rubber was found to be 16.2 g/10 minutes under Condition L as described in ASTM method D1238.

A 25.5 weight percent solution of starting rubber (43.6 kg) in dry hexane was heated to 154° C. in a sealed, agitated 80-gallon stainless steel reactor. Maleic anhydride (2,180 g) in 11.4 liters toluene was pressured into the reactor. After allowing for mixing of the monomer, 654 grams dicumyl peroxide (Hercules Di-Cup T) in 1.9 liters hexane was pressured into the reactor. The temperature and pressure were held at 152°–161° C. and 84–124 psig, respectively, for 60 minutes. After cooling of the mixture, the product was steam coagulated and dried at 65°–80° C. before use. Titrimetric analysis of a purified sample indicated 1.74 weight percent bound maleic anhydride. The properties of the product are reported in Table I.

EXAMPLE 4

The starting polymer is an amorphous ethylene/propylene rubber of Example 2 having about 55 mole percent ethylene, 1.92 RSV as measured on a 0.1% solution in decalin at 135° C., and a Mooney viscosity of ML (1+4) 20 at 257° F. The melt flow index of the starting rubber was found to be 2.5 g/10 minutes under Condition L of ASTM D1238.

A 17.1 weight percent solution of the starting rubber (29.1 kg) in dry hexane was heated to 156° C. in a sealed, agitated 80-gallon stainless steel reactor. Maleic anhydride (1998 g) in 11.4 liters toluene was pressured into the reactor. After allowing for mixing of the monomer, 436 g dicumyl peroxide (Hercules Di-Cup T) in 1.9 liters hexane was pressured into the reactor. The temperature and pressure were held at 156°–158° C. and 126–138 psig, respectively, for 60 minutes. After cooling of the mixture, the product was steam coagulated and dried at 65°–80° C. before use. Titrimetric analysis of a purified sample indicated 1.88 weight percent bound maleic anhydride. The properties of the product are reported in Table I.

It will be apparent to those familiar with the art that the dicumyl peroxide catalyst in Examples 3 and 4 can be replaced in whole or in part with other peroxide catalysts such as t-butyl peroxide, benzoylperoxide, t-butylperoctanoate, di-t-butylperoxide, t-butylhydroperoxide, cumene hydroperoxide, t-butyl perbenzoate, or other free radical source capable of hydrogen abstraction, as represented by alkyl peroxy exters, alkyl peroxides, alkyl hydroperoxides, diacyl peroxide and the like. Amount of catalyst as well as reaction conditions will vary with the choice of catalyst.

EXAMPLES 3A, 4A

The maleic anhydride in Examples 3 and 4 is substituted by equal molecular equivalents of other unsaturated dicarboxylic anhydrides and acids such as itaconic anhydride, fumaric anhydride, maleic acid, fumaric acid and itaconic acid in equal molecular equivalents of maleic anhydride.

EXAMPLE 5

The starting polymer is an amorphous ethylene/propylene rubber having about 55 mole percent ethylene, 2.84 RSV as measured on a 0.1% solution in decalin at 135° C., and a Mooney viscosity of ML (1+4) 67 at 257° F. The melt flow of the starting rubber was found to be 0.3 g/10 minutes under Condition L of ASTM D1238.

A 14.75 weight percent solution of the starting rubber (168.6 g) in dry hexane was heated to 155° C. in a sealed, agitated one-gallon stainless steel reactor. Maleic anhydride (8.43 g) in 20 g acetone was pressured into the reactor. After allowing for mixing of the monomer, 2.53 g dicumyl peroxide (Hercules Di-Cup T) in 23.7 g hexane was pressured into the reactor. The temperature and pressure were held at 155° C. and 150 psig, respectively, for 55 minutes. After cooling of the mixture, the product was recovered by steam coagulation and oven dried at 90°–100° C. before use. Titrimetric analysis of a purified sample indicated 1.18 weight percent bound maleic anhydride. The physical properties of the product are listed in Table I.

TABLE I

| Effect of Grafted Maleic Anhydride on Molecular Weight Properties Such as RSV, Mooney Viscosity, And Melt Flow Index | | | | |
|---|---|---|---|---|
| Example | % MAH Bound | ML 1 + 4 at 257° F. | RSV | Melt Flow Index (Cond. L) (g/10 min.) |
| 3 | 0 | 3 | 1.18 | 16.2 |
| 3 | 1.74 | 62 | 1.15 | 3.3 |
| 4 | 0 | 20 | 1.92 | 2.5 |
| 4 | 1.88 | 98 | 1.70 | 1.8 |
| 5 | 0 | 67 | 2.84 | 0.3 |
| 5 | 1.18 | 128 | 2.52 | 0.2 |

Examples 3, 4 and 5 and the tabulation in Table I show the effect of bound maleic anhydride (MAH) on polymer properties associated with molecular weight. Mooney viscosity and melt flow index reflect a marked increase in the molecular weight on grafting and crosslinking that occurs with the water present, whereas RSV indicates little change in molecular weight. The RSV measure is taken of a 0.1% solution in decalin at 135° C., which is sufficient to cause breakdown of the labile crosslinks for return of the polymers to their actual molecular weights with grafted MAH. Polymers of Examples 1 and 2 are originally liquid or semiliquid polymers which exhibit cold flow at room temperature.

The following examples demonstrate the effects of the polymer molecular weight and level of bound maleic anhydride upon the solution cement viscosity.

EXAMPLE 6

The starting polymer is an amorphous ethylene-propylene rubber having about 55 mole percent ethylene, 1.18 RSV as measured on a 0.1% solution is decalin at 135° C., and a Mooney viscosity of ML (1+4) 3 at 257° F.

A 20.0 weight percent solution of the starting polymer (300 g) in dry hexane was heated to 158° C. in a sealed, agitated one-gallon stainless steel reactor. Maleic anhydride (12.0 g) in 68 g toluene was pressured into the reactor. After allowing for mixing of the monomer, 4.5 g dicumyl peroxide (Hercules Di-Cup T) in 13.5 g hexane was pressured into the reactor. The temperature and pressure were held at 156°–158° C. and 140–158 psig, respectively, for 60 minutes. After cooling of the mixture, the product was recovered by steam coagulation and oven dried at 90°–100° before use. Titrimetric analysis of a purified sample indicated 1.17 weight percent bound maleic anhydride. Physical properties of the product are reported in Table IV.

EXAMPLE 7

The starting polymer is an amorphous ethylene/propylene rubber having about 55 mole percent ethylene, 1.95 RSV as measured on a 0.1% solution in decalin at 135° C., and a Mooney viscosity of ML (1+4) 25 at 257° F.

To a 20.0 weight percent solution of the starting polymer (332.6 g) in dry hexane was added 0.34 g Irganox 1076 antioxidant (Ciba-Geigy). The solution was heated to 153° C. in a sealed, agitated one-gallon stainless steel reactor. Maleic anhydride (9.98 g) in 40 g toluene was pressured into the reactor. After allowing for mixing of the monomer, 4.99 g dicumyl peroxide (Hercules Di-Cup T) in 22 g hexane was pressured into the reactor. The temperature and pressure were held at 153°–155° C. and 126–160 psig, respectively, for 60 minutes. After cooling of the mixture the product was recovered by steam coagulation and oven dried at 90°–100° C. before use. Titrimetric analysis of a purified sample indicated 0.9 weight percent bound maleic anhydride. Physical properties of the product are reported in Table IIIA.

In a second reaction a 20.0 weight percent solution of the starting rubber (308.5 g) in dry hexane was heated to 155° C. in a sealed, agitated one-gallon stainless steel reactor. Maleic anhydride (15.43 g) in 15.6 acetone was pressured into the reactor. After allowing for mixing of the monomer, 4.63 g dicumyl peroxide (Hercules Di-Cup T) in 23.1 g hexane was pressured into into the reactor. The temperature and pressure were held at 155°–157° C. and 170 psig, respectively, for 50 minutes. After cooling of the reaction mixture, the product was recovered by steam coagulation and oven dried at 90°–100° C. before use. Titrimetric analysis of a purified sample indicated 1.37 weight percent bound maleic anhydride. Physical properties of the product are reported in Table IIIA.

For Examples 6 and 7, the Brookfield viscosities were measured at room temperature (23° C.). Reaction product cements were measured within 24 hours of the end of the reaction.

The instrument used for measurement is a Brookfield Synchro-Lectric Viscometer, Model RVT.

TABLE IIIA
Effect of MAH Graft on Cement Viscosity

| Example | % MAH Bound | RSV | ML 1 + 4 at 257° F. | Wt. % Solids | Cement viscosity at room temperature (CPC) |
|---|---|---|---|---|---|
| 6 | 0 | 1.18 | 3 | 19.1 | 1,160 |
| 6 | 1.17 | 1.18 | 34 | 19.1 | 2,430 |
| 7 | 0 | 1.95 | 25 | 20.0 | 11,400 |
| 7 | 0.90 | 1.98 | 50 | 20.4 | 17,200 |
| 7 | 1.37 | 1.94 | 95 | 20.0 | 23,320 |

It will be seen that the lower the molecular weight of the rubber polymer the lower cement viscosities both before and after grafting. Thus, higher throughputs can be achieved with lower RSV rubbers. Such higher solids is desirable from the standpoint of the relationship between solids levels and graft efficiency.

The level of solids EPM in the cement has a linear affect on the degree of graft. Within the range of 15–25 percent solids, a 1 percent change in solids has about a 0.05 percent change in the degree of graft, in which the degree of graft increases with increased solids.

The degree of graft is also influenced somewhat by the peroxide level. For example, within the range of 1–2 phr peroxide catalyst (Di-Cup), a 0.1 phr increase in catalyst will yield about a 0.5% increase in degree of graft. The degree of graft is defined as the weight of bound maleic anhydride divided by the combined weight of rubber plus bound maleic anhydride, expressed as a percent.

Illustration will now be made of the demonstrated utility of the adducts of this invention to increase the impact strength and toughness of polyamides.

General conditions of blending and molding were as follows.

Blends were prepared by passing mixtures of rubber and predried nylon resin three times through a single screw extruder with screw dimensions of 1"×23", a barrel temperature of 420°–450° F., exit temperatures of 375°–400° F. and extrusion rates of 10–20 grams per minute. 50% blends were first prepared and these were later diluted with the polyamide (nylon) to the desired composition. Injection molded samples were stored in moisture proof polyethylene bags for 16–24 hours before testing.

Notched Izod impact strengths were measured according to ASTM method D256-56.

Melt flow index of the blends was measured on an extrusion plastometer at 235° C. with a load of 2.16 Kg (Condition R of ASTM D1238-65T), except where noted.

Tensile strengths were measured according to ASTM method D638-68.

Rockwell hardness was measured according to ASTM method D785-65.

The effect of rubber molecular weight upon blend properties is illustrated in Table IV.

TABLE IV
Properties of MAH Grafted Rubbers of Different Molecular Weights and Their Blends with Nylon 6

| | Example | | | | | | | |
|---|---|---|---|---|---|---|---|---|
| | 7 | 7A | 7B | 7C | 8 | 9 | 10 | Control |
| Source of Rubber | Example 3 | Example 3 | Example 3 | Example 3 | Example 6 | Example 4 | Example 5 | |
| % Bound MAH | 1.74 | 1.74 | 1.74 | 1.74 | 1.18 | 1.88 | 1.18 | — |
| RSV | 1.15 | 1.15 | 1.15 | 1.15 | 1.18 | 1.70 | 2.52 | — |
| MFI (Cond. L, | 3.27 | 3.27 | 3.27 | 3.27 | 18.4 | 1.83 | 0.21 | — |
| ML 1 + 4 @ 257° F. | 62 | 62 | 62 | 62 | 34 | 98 | 128 | — |
| Blend Properties | | | | | | | | |
| % Rubber | 5 | 10 | 15 | 20 | 15 | 15 | 15 | 0 |
| Izod Impact Strength (ft.-lbs./inch of notch) (⅛" sample) | 2.2 | 2.7 | 18.4 | 20.0 | 16.6 | 14.2 | 13 | 1.0 |
| Tensile Strength (psi) | 7387 | 6027 | 5824 | 4612 | 6030 | 6400 | 7280 | 10,600 |
| MFI (Cond. R, g/10 min.) | 20.0 | 18.2 | 10.6 | 9.0 | 13.3 | 11.2 | 12.1 | 24.8 |

It will be seen from the above that the greatest improvement in impact strength occurs in Examples 7B and 8 containing the lowest molecular weight rubbers in the compositions having 15% blended rubber. This is further illustrated by a comparison of Examples 8 and 10 and between Examples 7 and 9 in which the grafted EPM rubbers have substantially the same degree of graft but differ in molecular weight. Marked improvement in impact strength is illustrated in all of the rubber blends in comparison with the control of unblended nylon.

Surprisingly, the rubbers which themselves have the highest melt flows produce blends with the lowest melt flows. It is believed that the rubbers with the highest melt flows provide for better mixing. All other factors being equal, better mixing is achieved when the materials are of the same viscosity. Better mixing results in better dispersion and implies smaller particle size with corresponding reduction of the melt flow of the mixture. The effect is believed to be due to increased surface area with smaller particles, with the result that the melt flow trend of the blends is opposite that of the unblended rubbers.

The decrease in melt flow of a blend has been found to be a function of rubber content in which increased rubber level reduces the melt flow of the blend. This is advantageous in instances where increased melt strength is desired.

EXAMPLE 11

The starting polymer is an amorphous ethylene/propylene rubber having about 55 mole percent ethylene, 2.09 RSV as measured on 0.1% solution in decalin at 135° C. and a Mooney viscosity of $ML_{(1+4)}$ 28 at 257° F. This was grafted at 20 per cent by weight solids with maleic anhydride in a manner analogous to that of Example 3. The product was found to contain 1.6 weight percent maleic anhydride. The steam coagulated product had an RSV of 1.77, Mooney viscosity of 110 $ML_{(1+4)}$ at 257° C. and a melt flow index of 1.19 grams/10 minutes.

EXAMPLE 12

The grafted EPM of Example 11 was blended with various amounts of Capron 8202C nylon 6 resin manufactured by Allied Corporation. The grafted EPM had a maleic anhydride content of 1.60%. Table V illustrates the effect of rubber level upon melt flow index of the blend.

TABLE V

| Percent polymer in blend | Dry impact strength notched Izod FT-Lb/inch | Melt flow index |
|---|---|---|
| 0 | 0.67 | 25.9 |
| 10 | 2.4 | 14.1 |
| 15 | 13.3 | 9.5 |
| 20 | 19.7 | 4.9 |
| 50 | — | 0.06 |

The following examples illustrate the effect of the proportion of acid versus anhydride form of the grafted maleic anhydride upon the properties of the blend.

EXAMPLE 13

Infrared analysis of the grafted rubber of Example 11 indicated that over 75% of the maleic groups existed in acid form. This is believed to be a natural consequence of hydrolysis caused by steam coagulation of the polymer.

The properties of a 15% blend of the maleic rubber of Example 11 and Capron 8202C nylon 6 are given in Table VI.

EXAMPLE 14

A sample of the grafted rubber of Example 11 was heated in a Carver press at a temperature of 450° F. for 15–30 seconds in order to convert bound maleic groups from the acid from back to the anhydride form. Infrared analysis indicated that over 75% of the maleic groups now existed in the anhydride form.

A blend of the treated maleic rubber was made with Capron 8202C as in the previous examples with the results in Table VI.

TABLE VI

| Effect of Maleic Form on Nylon Blend Properties | | |
|---|---|---|
| | Example 13 | Example 14 |
| Rubber Properties | | |
| Degree of Graft (MAH) | 1.60 | 1.60 |
| RSV | 1.77 | 1.66 |

TABLE VI-continued

| Effect of Maleic Form on Nylon Blend Properties | | |
|---|---|---|
| | Example 13 | Example 14 |
| MFI Condition L g/10 min. | 1.17 | 1.28 |
| ML (1 + 4) at 257° F. | 110 | 70 |
| Blend Properties | | |
| % Rubber | 15 | 15 |
| Impact Strength (ft-lbs/inch of notch) (⅛" sample) | 13.3 | 16.4 |
| Tensile Strength (psi) | 6587 | 6256 |
| Rockwell Hardness | R104 | R107 |

The prepared material Example 14 has a slight advantage over the material of Example 13 in terms of impact strength but suffers somewhat from lower tensile strength. This indicates, however, that improvement in impact strength is obtained either from the acid form or the anhydride form, especially at lower molecular weights of the backbone rubber.

EXAMPLES 15, 16

The rubber used to modify the nylon may itself be a blend of the maleic anhydride grafted EPM and one or more other compatible rubbers. This is illustrated as follows.

Example 15 is a blend containing 80 percent by weight Capron 8202C (Allied Corporation) as the nylon and 20 percent by weight the grafted rubber of Example 11 having a bound maleic anhydride level of 1.6 percent by weight of grafted rubber. The properties of the blend of Example 15 are shown in Table VII.

Example 16 is a ternary blend containing 80 percent by weight Capron 8202C, and 20 percent by weight a 50/50 blend of the grafted rubber of Example 11 and the ungrafted starting ethylene-propylene polymer of Example 5. The properties of the blend of Example 16 are shown in Table VII.

TABLE VII

| | Example 15 | Example 16 | Comments |
|---|---|---|---|
| % Total Rubber | 20 | 20 | |
| Effective % Bound Maleic Anhydride | 1.6 | 0.8 | % of total rubber |
| Notched Izod Impact Strength (ft-lbs/inch) | 19.7 | 19.5 | at 23° C. |
| | 10.8 | 8.3 | at −20° C. |
| Tensile Strength (psi) | 5909 | 6080 | |
| Rockwell Hardness | R99 | R102 | |

This table demonstrates that useful blends can be obtained when some of the grafted rubber is replaced by another rubber with which it is compatible. In the case of Example 16, the effective level of bound maleic anhydride in the rubber is one-half of 1.6% or 0.8% by weight.

Example 16 also illustrates the ability of the grafted EPM of this invention to provide compatibility between materials which by themselves are ordinarily not compatible, the materials being ungrafted polyolefins and nylon.

EXAMPLES 17

Good impact strength at low temperature is noted for the blends of Examples 15 and 16. This is further illustrated in Table VIII.

The rubber of Example 17 is a maleic anhydride grafted ethylene-propylene rubber having the characteristics described in the table.

TABLE VIII
Low Temperature Impact Strength

|  | Example 15 | Example 17 | Capron 8202C Control |
|---|---|---|---|
| % Rubber | 20 | 20 | 0 |
| Bound Maleic Anhydride (% of rubber) | 1.6 | 1.6 | — |
| Mole % Ethylene In Rubber | 55 | 55 | — |
| Rubber RSV | 1.77 | 0.98 | — |
| Notched Izod Impact Strength (ft-lbs/inch) | | | |
| at room temperature | 19.7 | 19.9 | 0.67 |
| at −20° C. | 10.8 | 19.2 | 0.46 |

Substantial improvement in low temperature impact strength is demonstrated in this table. Additionally, the advantage of lower RSV rubber is demonstrated by the higher impact strengths of Example 17.

EXAMPLES 18

This example is an illustration of a maleic anhydride grafted EPM blended with a nylon resin other than nylon 6. The nylon of the example is BMNO type 11 nylon manufactured by the Rilson Corporation. The rubber of the example is the grafted EPM of Example 3. Properties of the blend and the unmodified nylon resin are shown in Table IX.

TABLE IX
Properties of Modified Nylon 11

|  | Nylon 11 | Example 16 |
|---|---|---|
| % Rubber | 0 | 15 |
| Tensile Strength (psi) | 5920 | 4480 |
| Notched Izod Impact Strength (23° C.), (ft-lbs/inch) | 3.6 | 11.5 |
| Rockwell Hardness | R93 | R73 |
| Melt Flow Index (192° C., 2160 g) (g/10 min.) | 31 | 12 |

The maleic anhydride grafted EPM is seen from the table to provide an improvement in the impact strength of the nylon 11.

It will be apparent from the foregoing that material improvement in impact strength and toughness can be achieved, in accordance with the practice of this invention, by blends that are formed of preferably low molecular weight, maleic anhydride grafted EPM rubbers with nylon at elevated temperatures such to disrupt the crosslinks which originally existed in the grafted EPM polymer. It will be understood that improvement in impact strength can be obtained also with grafted EPM rubbers of the type described in which the grafted EPM rubbers are of high molecular weight. It will be understood further that changes may be made in the details of formulation and operation without departing from the spirit of the invention, especially as defined in the following claims.

I claim:

1. A polyamide blend having improved impact strength and toughness consisting essentially of 50-98 parts by weight of the polyamide resin blended with 2-50 parts by weight of grafted and reversibly crosslinked ethylene and propylene copolymer rubber, the base rubber of which is a liquid or semi-liquid of low molecular weight having an RSV within the range of 0.4-3.0% and in which the material grafted onto the EPM is an anhydride having the general formula:

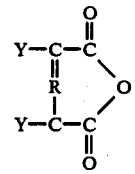

or corresponding or derivative thereof having the general formula

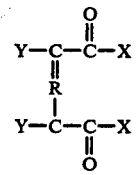

in which R is an alkylene group having from 1 to 4 carbon atoms, Y is selected from the group consisting of hydrogen, halogen or an organic group having from 1-12 carbon atoms and X is a hydroxyl or ester forming group but in which at least one X is hydroxyl, and in which the crosslinks will be easily disruptable in use whereby the grafted and crosslinked low molecular weight rubber comprises a solid high molecular weight material which converts to a low molecular weight in use.

2. A polyamide blend as claimed in claim 1, in which the propylene is present in the EPM in the ratios of 95-10 moles of ethylene to 5-90 moles of propylene.

3. A polyamide blend as claimed in claim 1, in which the material grafted onto the EPM is maleic anhydride.

4. A polyamide blend as claimed in claim 1, in which the material grafted onto the EPM is a maleic acid or mono ester thereof.

5. A polyamide blend as claimed in claim 1, in which the amount of graft is within the range of 0.5-4.0% of the weight of the rubber cement.

6. A polyamide blend as claimed in claim 1, in which the amount of graft is within the range of 0.2-5% of the rubber cement.

7. A polyamide blend as claimed in claim 1, in which the EPM has an RSV within the range of 0.7-2.5.

8. A polyamide blend as claimed in claim 1, in which the crosslinks are disruptable when heated to a temperature above 125° C. during blending.

9. A polyamide blend as claimed in claim 1, in which the polyamide is polycaprolactam.

10. A polyamide blend as claimed in claim 1, in which the polyamide is poly(undecaneamide).

11. The method of producing a polyamide blend clamied in claim 1, in which the polyamide is blended with the grafted and reversibly crosslinked copolymer rubber at a temperature above 150° F. whereby crosslinks are disrupted to provide a blend component of low molecular weight and high melt flow to optimize mixing and dispersions of blended rubber with the polyamide.

12. The method as claimed in claim 11, in which the polyamide is a polycaprolactam resin.

13. The method as claimed in claim 11, in which the polyamide is a poly(undecaneamide) resin.

14. The method as claimed in claim 11, in which the polyamide and grafted copolymer rubber are blended by co-extrusion at elevated temperature.

15. The method as claimed claim 11, in which the components are blended in the ratio of 1-50 parts by weight of the grafted EPM rubber to 99-50 parts by weight of the polyamide.

* * * * *

UNITED STATES PATENT AND TRADEMARK OFFICE
CERTIFICATE OF CORRECTION

PATENT NO. : 4,594,386
DATED : June 10, 1986
INVENTOR(S) : Errol J. Olivier

It is certified that error appears in the above-identified patent and that said Letters Patent is hereby corrected as shown below:

In claim 1, column 14, line 10 (first line of words in column 14), after "corresponding", insert -- dicarboxylic acid --.

In claim 1, column 14, line 20, delete "1" and insert therefor -- 0 --.

Signed and Sealed this

Eighteenth Day of November, 1986

Attest:

DONALD J. QUIGG

Attesting Officer

Commissioner of Patents and Trademarks